P. FERCHLAND & J. NUSSBAUM.
ELECTRODE FOR ELECTROLYTIC PURPOSES.
APPLICATION FILED NOV. 5, 1906.
900,502.
Patented Oct. 6, 1908.
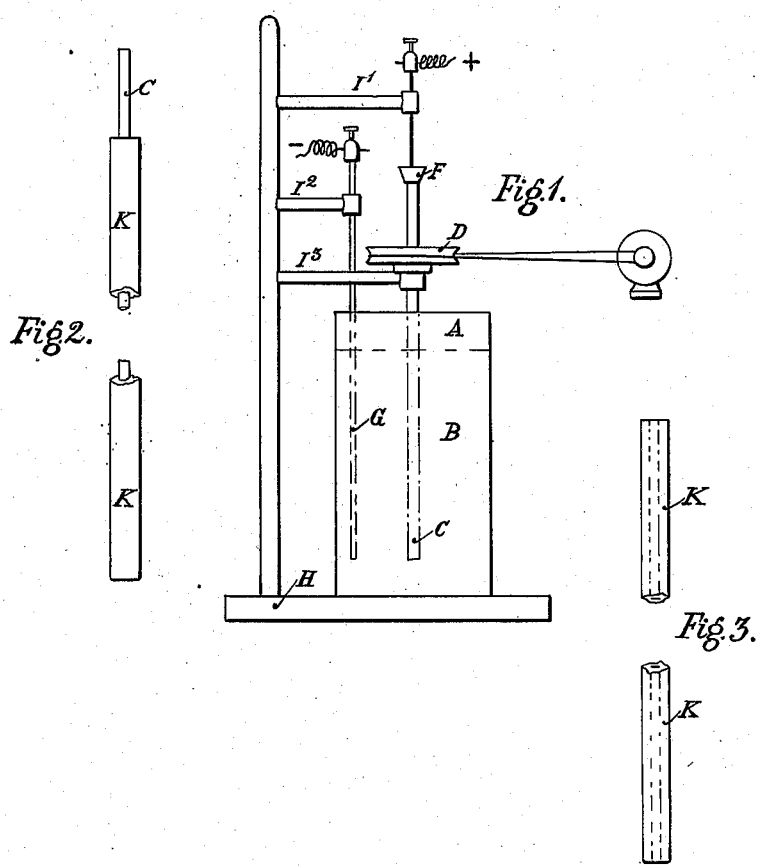
Witnesses:
Dr. Fritz Holle
Ludwig Schiff
Inventors:
Joseph Nussbaum
and Paul Ferchland
by
Dr. Paul Ferchland

UNITED STATES PATENT OFFICE.

PAUL FERCHLAND, OF BERLIN, AND JOSEPH NUSSBAUM, OF CHARLOTTENBURG, GERMANY.

ELECTRODE FOR ELECTROLYTIC PURPOSES.

No. 900,502.  Specification of Letters Patent.  Patented Oct. 6, 1908.

Application filed November 5, 1906. Serial No. 342,140.

*To all whom it may concern:*

Be it known that we, PAUL FERCHLAND, chemist, a subject of the King of Prussia, residing at Berlin, Germany, and JOSEPH NUSSBAUM, engineer, a subject of the Emperor of Austria-Hungary, residing at Charlottenburg, Germany, have invented certain new and useful Improvements in and Connected with Electrodes for Electrolytic Purposes, of which the following is a specification.

This invention relates to improvements in and connected with electrodes for electrolytic purposes.

In electrolytic processes, when it is not desired to dissolve or destroy the positive electrode, platinum or artificial carbon or in some cases lead or superficially peroxidized lead are the materials generally employed for constituting the positive poles. Of these materials, platinum is applicable in only few cases owing to its exorbitant price, although it has been attempted to reduce the quantity of platinum required as much as possible by using very fine wires fused into glass tubes and conducting the electric currents to the inner ends of the platinum wires. But even these platinum-glass electrodes are too costly for most purposes and moreover are exceedingly brittle and easily damaged. Furthermore there are but few processes by which platinum is not more or less dissolved when it is used as anode, there being in some cases a loss of precious metal and in other cases in addition to that defect the cathodic action, as for instance the deposition of zinc, is interfered with. Carbon electrodes on the other hand are objectionable from another point of view, in that they are oxidized by anodic oxygen to carbon dioxid. In consequence, in electrolyzing aqueous solutions of common salt, the chlorin gas obtained is always deteriorated by a considerable percentage of carbon dioxid (from 10 to 12 per cent). Moreover organic chlorin compounds such as chloroform or hexachlorid of benzene are formed which appear to the disappointment of the manufacturer when chlorin has to be condensed or when certain organic chlorin compounds have to be produced. But the greatest inconvenience from the presence of the carbon dioxid results in the manufacture of bleaching powder for which chlorin is mostly used; for, owing to a great part of the lime being saturated by carbonic acid instead of chlorin, the resulting bleaching powder is not only of lower percentage, but also far less readily preserved than it would be if pure chlorin had been employed.

Electrochemists have for long looked out for a material capable of being substituted for carbon or platinum in making electrodes. Plates of lead may be employed in certain cases, such as for instance in regenerating solutions of chromic acid by electrolysis. Small quantities of lead being dissolved in this case, however, the lead electrodes are consumed within a short time. For other purposes, as in the electrolysis of solutions of sulfate of zinc, lead electrodes are unserviceable, the lead dissolved being reduced at the cathodes whereby the deposit of zinc is made impure and spongy. Lead anodes used in chlorin solutions even if oxidized are immediately made non-conducting by the formation of chlorin of lead.

Peroxid of lead is attacked neither by oxygen nor by chlorin electrolytically set free on it, as is well known. But inventors who have intended producing electrodes made of peroxid of lead have not succeeded in discovering a suitable form or condition of this material adapted for the purpose in question. It has been proposed, for instance, to build up electrodes from litharge pressed into briquets or tiles and to oxidize the whole by an electric current. Such electrodes would be of an exorbitant weight and of relatively small conductivity, and it would be very difficult (or even impossible) to attach reliable contacts to them.

Now an important object of the present invention is to produce electrodes of lead peroxid of good mechanical and conductive qualities and to devise a process or processes for obtaining such electrodes in a convenient and inexpensive way. For this purpose we make the electrodes of that form of peroxid of lead which is deposited on the positive pole in electrolyzing lead salt solutions. (Only simple lead salts such as lead nitrate are adapted for the purpose; complex lead compounds such as sodium plumbate $Na_2O.PbO$, obtained by dissolving lead salts in caustic soda are objectionable). Solutions of lead nitrate are preferred for this purpose. Colloidal substances, such as gum arabic or a decoction of linseed, may be added to the solution of lead nitrate in order to make the deposit more smooth and glossy.

The conductors upon which the lead peroxid is to be deposited may be plates or wires or tubes or rods of any suitable material; or any other suitable form such as screens or network or the like may be employed. Any suitable material not attacked by the electrolytic action of the current may be used. Iron in its passive state, platinum, artificial carbon are suitable for the purpose. Also non-conductors of electricity after being coated or covered with suitable conducting substances, such as, for instance, glass or earthenware rods or tubes coated with a thin layer of platinum or of peroxid of lead itself, may be employed. These conductors or non-conductors upon which the peroxid of lead is deposited may be removed afterwards or not, according as the especial circumstances may require. But when non-conductors are used as carriers of the electrode material, we prefer to let the carriers remain in the electrode, the strength of the latter being considerably increased by the non-conductor forming a kind of core or skeleton in the electrode.

In order to prevent internal tensions or strains in the deposit, it is necessary to control or direct the process of deposition in such a manner that the deposit may obtain the same thickness and structure at every point and that no bending or buckling of the core or skeleton may occur during the deposition. Therefore when sheets such as iron or platinum plates are used as a basis for the deposit, the lead peroxid must be deposited equally on both sides of the sheets. Likewise, when wires, rods or cylinders are to be coated with the deposit, the latter must be kept equable all around the wire or rod or the like. We have found that this end is best attained by revolving the wire, rod or cylinder round its own axis during the whole period of deposition. In carrying out our invention, we fill a cylindrical or other suitable vessel of non-conducting material with a strong solution of nitrate of lead containing say 25 percent. of the said salt. Above said vessel we fix horizontally a disk or wheel revoluble on a vertical shaft in suitable bearings. Concentric to the said shaft, a carbon rod or other suitable conductor, or a non-conductor the surface of which has been made conductive, is secured to the revoluble shaft extending nearly to the bottom of the vessel and connected by means of brushes or other sliding contacts with the positive pole of a suitable source of electricity. At some distance from the carbon rod or other conductor forming the anode of the bath, one or more rods or strong wires of copper or any other suitable conductive substance are immersed in the solution and connected with the negative pole of the electric generator thus forming the cathode or cathodes of the electrolytic bath. The electric current passing through the bath thus arranged may be regulated so that the current-density at the anode may be about 6 amperes per square decimeter. A smaller or larger current-density may be used according as the surface of the anodic core or skeleton, or other circumstances, may require.

Owing to the electrolytic action of the current, lead peroxid is deposited on the anode and crystals of metallic lead or lead in a compact state when colloidal substances are used are deposited at the cathode or cathodes of the bath. The metallic lead may be removed at intervals or continuously from the cathodes preferably by means of oscillating scrapers or the like, as is generally known in electrometallurgy, or in the case of colloidal solutions, the plates or the like on which the compact metallic lead is deposited may be intermittently removed from the bath. Equivalent quantities of lead and lead peroxid being thus eliminated from the solution, nitric acid is continuously formed. To neutralize the latter and to replace the elements which are precipitated by the current we may introduce continuously or intermittently oxids of lead, carbonate of lead, white lead or litharge or any other suitable lead compounds into the bath. The above mentioned crystals of metallic lead which are easily oxidized in contact with air may be used for this purpose. These compounds of lead may be brought together or mixed with the solution in any suitable way, but we prefer to hang bags filled with lead oxid into the solution to continuously neutralize the same.

When a sufficient thickness of the deposit of lead peroxid is attained, the current is cut off and the anode is removed from the bath. It may be used as an electrode in electrolytic processes just as it comes from the bath, or the inner core or skeleton may be previously removed, if desired. When, for instance, carbon rods are used as a basis for the deposit, the carbon core may be bored or drilled out, so that the electrode of lead peroxid remains in the form of a tube.

In order that the invention may be more clearly understood reference is made to the accompanying drawing, in which Figure 1 shows a suitable apparatus for carrying our process into practice, Fig. 2 shows the electrode from which the conductor on which the lead peroxid has been deposited has not yet been removed, Fig. 3 is an electrode ready for use, the original conductor having been removed.

In Fig. 1 A is a suitable vessel containing a strong solution B of lead nitrate for example. C is a suitable conductor, consisting of any material not attacked by the electrolytic action, such as for instance iron, platinum or carbon; but we prefer to use carbon rods such as are in common use for electric arc lamps. This conductor C is firmly attached to a disk or groove-pulley D driven by a belt from a motor E. The electric current is supplied by means of a mercury cup F or in any other suitable way, and is conducted away by the metal rod or wire G forming the cathode. The electric terminals and the bearing in which the conductor C is rotated are held by arms I', I², I³ mounted on a suitable base H. Means for removing the lead deposited on the cathode are not shown.

In Figs. 2 and 3 K K represents the body of the electrode consisting merely of lead peroxid, the center portions being shown broken away; the conductor C is still in the electrode in Fig. 2 and is shown removed in Fig. 3.

As already mentioned above, conductors or non-conductors may be used as a core or skeleton for the deposit of lead peroxid. When glass or porcelain or common china or earthenware is to be used, we prefer to coat the same with a thin layer of peroxid in the following manner. The body to be treated is firstly coated with a thin layer containing lead or lead compounds, as for instance by glazing or enameling the same by means of lead oxid. Glass or earthenware bodies coated with the common potter's glazing containing lead may be used, or the bodies may be painted or impregnated with a mixture of lead oxid and a suitable binding medium, agglutinant or paste, or if the bodies are porous pulverized peroxid of lead may be rubbed into their surface. The body thus covered with a layer containing lead is then introduced in an oxidizing solution, such as a solution of sodium hypochlorite, whereby the lead oxid is converted into lead peroxid. The oxidation may be completed by electrolytic action. For instance, we dip a rod or tube of glass into a mixture of lead oxid and diluted glycerin. After the excess of the mixture has been removed by allowing it to drip off, the body is dried and then placed in a solution of sodium hypochlorite or bleaching lye. It is not advisable to continue this operation for too long a time, because in this case the hypochlorite begins to decompose owing to a catalytic action and the deposit scales off from the glass body. Half a day will be sufficient for the purpose. The glass body is now dried and its entire length is then heated by means of a blast-flame, whereby the peroxid of lead is partially decomposed and fused together or incorporated with the glass. The body thus prepared is then again placed in a hypochlorite solution for a longer time, say for one or two days, because no further scaling off is to be feared. A thin layer of conductive peroxid of lead is thus produced which may be strengthened by using the body as an anode in an electrolytic bath of diluted sulfuric acid or the like, the current being passed into the body by means of a sheet of lead wound round its upper end. This operation may be continued until the coating is thoroughly oxidized and converted into peroxid of lead. The body thus prepared may be further coated with peroxid of lead in a bath of nitrate of lead just in the same manner as described above. This being done, the deposit appears intimately united with the glass and the compound electrode may be suddenly dipped into boiling water or when hot into cold water without bursting or cracking.

Having thus described our invention what we claim as new and desire to secure by Letters Patent is:—

1. The herein described process for making electrodes for electrolytic purposes, consisting in dipping suitable conductors into a solution of a lead salt to form the anode and the cathode of an electric current, passing an electric current through the said conductors and the solution, until a deposit of considerable thickness has formed on the anode, and then removing the original conductor forming the anode.

2. The herein described process of making electrodes for electrolytic purposes, consisting in coating a non-conductor of electricity with a thin layer of peroxid of lead and then depositing peroxid of lead upon said layer by dipping the said non-conductor coated with a conducting layer into a solution of a lead salt to form the anode of an electric current, another suitable conductor forming the cathode of the said current, and then passing an electric current through the said conducting layer, the solution and the conductor forming the cathode.

3. The herein described process for making electrodes for electrolytic purposes, consisting in dipping suitable conductors into a solution of a lead salt to form the anode and the cathode of an electric current, passing an electric current through the said conductors and the solution, until a deposit of considerable thickness has formed on the anode, and then separating the said deposit from the said conductor forming the original anode.

4. The herein described process for making electrodes for electrolytic purposes, consisting in dipping suitable conductors into a solution of a lead salt to form the anode and the cathode of an electric current, rotating the said anode and at the same time passing an electric current through the said conductors and the solution, until a deposit of considerable thickness has formed on the said anode, and then separating the said deposit from the said conductor forming the original anode.

5. The herein described process for making electrodes for electrolytic purposes, consisting in coating a non-conductor of electricity with a thin layer of peroxid of lead and then depositing peroxid of lead upon said layer by dipping the said non-conductor coated with a conducting layer into a solution of a lead salt to form the anode of an electric current, another suitable conductor forming the cathode of the said current, then rotating the said non-conductor and at the same time passing an electric current through the said conducting layer, the solution and the said cathode.

In testimony whereof we have hereunto set our hands in presence of two subscribing witnesses.

PAUL FERCHLAND.
JOSEPH NUSSBAUM.

Witnesses for Paul Ferchland:
WOLDEMAR HAUPT,
HENRY HASPER.

Witnesses for Joseph Nussbaum:
VINCENT BURES,
A. DONATI.